(12) United States Patent
Keister

(10) Patent No.: US 7,595,000 B2
(45) Date of Patent: Sep. 29, 2009

(54) OPERATION OF EVAPORATIVE COOLING TOWERS WITH MINIMAL OR NO BLOWDOWN

(75) Inventor: Timothy E. Keister, Brockway, PA (US)

(73) Assignee: ProChamTech International, Inc., Brockway, PA (US)

( * ) Notice: Subject to any disclaimer, the term of this patent is extended or adjusted under 35 U.S.C. 154(b) by 5 days.

(21) Appl. No.: 12/070,794

(22) Filed: Feb. 21, 2008

(65) Prior Publication Data

US 2009/0211983 A1  Aug. 27, 2009

(51) Int. Cl.
*C02F 1/42* (2006.01)

(52) U.S. Cl. .................. 210/687; 210/167.01; 210/697; 210/701

(58) Field of Classification Search ............... 210/687, 210/697, 701, 167.01
See application file for complete search history.

(56) References Cited

U.S. PATENT DOCUMENTS

| | | | |
|---|---|---|---|
| 4,532,045 A | | 7/1985 | Littmann |
| 4,640,793 A | * | 2/1987 | Persinski et al. ............. 252/180 |
| 4,931,187 A | | 6/1990 | Derham et al. |
| 5,284,590 A | * | 2/1994 | Kohlhofer et al. ........... 210/701 |
| 5,589,106 A | * | 12/1996 | Shim et al. .................. 252/387 |
| 5,730,879 A | | 3/1998 | Wilding et al. |
| 6,645,384 B1 | * | 11/2003 | Richardson et al. ......... 210/699 |
| 6,929,749 B2 | | 8/2005 | Duke et al. |
| 6,949,193 B2 | | 9/2005 | Duke et al. |
| 6,998,092 B2 | | 2/2006 | Duke et al. |
| 7,122,148 B2 | | 10/2006 | Duke et al. |
| 7,157,008 B2 | | 1/2007 | Owens |
| 2005/0247638 A1 | | 11/2005 | Owens |
| 2007/0246352 A1 | | 10/2007 | Keister |
| 2008/0020470 A1 | | 1/2008 | Keister |

* cited by examiner

*Primary Examiner*—Chester T Barry
(74) *Attorney, Agent, or Firm*—Kilyk & Bowersox, P.L.L.C.

(57) ABSTRACT

A method and composition are provided for the operation of an evaporative cooling tower with minimal, or no, blowdown. In some embodiments, the method involves using sodium cation-exchanged softened water as makeup water for the cooling tower, providing a bypass filter for suspended solids removal from the cooling water, treating the cooling water with a composition for control of corrosion and deposition, and using an effective biocide for control of biological growth within the cooling tower system. In some embodiments, a composition is provided that comprises AMPS acrylic terpolymer, sodium silicate, phosphate ions, and polyphosphate ions. When dosed at the recommended levels, the composition controls corrosion of cooling system materials to generally acceptable levels in spite of the extremely corrosive environment resulting from the cycling of sodium cation-exchanged softened water in the cooling tower.

7 Claims, No Drawings

OPERATION OF EVAPORATIVE COOLING TOWERS WITH MINIMAL OR NO BLOWDOWN

FIELD

The present teachings pertain to compositions and methods for preventing corrosion and deposition within a cooling tower, and to processes for operation of evaporative cooling towers with minimal or no blowdown.

BACKGROUND

Evaporative cooling towers are the most cost effective means to provide cooling for commercial air conditioning and industrial processes. From 75% to 80% of the incoming heat load to an evaporative cooling tower is removed by evaporation of cooling water. As the cooling water evaporates, removing heat from the system, the dissolved solids present in makeup water, added to replace the evaporated water and maintain cooling water level in the cooling tower, become more concentrated. At some point, the dissolved materials exceed the solubility limit(s), commonly called the saturation point, which results in precipitation and formation of undesirable scale (usually calcium carbonate).

Blowdown is water intentionally drained from the cooling tower to restrict the buildup of dissolved solids to levels below their saturation point. Cycles is a term used to denote the concentration of dissolved solids in the system water as compared to the makeup water. For instance, two cycles indicates that the dissolved solids in the system water are twice (two times) the level in the makeup water.

Blowdown constitutes a major environmental impact from cooling tower system operation as it is "wasted" water, water run to sewers that must be replaced with fresh water. For instance, a 1000 ton rated cooling tower running at two cycles will evaporate 25,000 gallons per day (gpd) with a blowdown of 25,000 gpd. If the cycles are increased to four, the blowdown would be reduced to 12,000 gpd. Basically, evaporation equals 25.0 gpd/ton cooling (one ton cooling is defined as 12,000 btu/hr) while blowdown is calculated as evaporation/cycles−1.

Cooling towers are routinely operated at two to six cycles and are generally treated with a variety of scale, corrosion, and biological control (biocide) control chemicals. As a result, cooling tower blowdown has high dissolved solids content and often contains substantial amounts of toxic materials, primarily biocides. The high dissolved solids and biocide content of cooling tower blowdown create an adverse environmental impact when discharged to the public sewers or surface waters. In addition, environmental restrictions on discharge of some active corrosion inhibitors, such as phosphate, zinc, and molybdate, have placed restrictive limits on the amount of cooling tower blowdown that can be discharged.

A small amount of water is also lost from an operating cooling tower in the air stream passing through the unit; this is commonly termed "windage" and can vary, for example, from about 0.1% to about 0.3% of the cooling water recirculation rate. Windage limits the maximum number of cycles that can be obtained in a cooling tower as it constitutes a water loss from the system. Maximum cycles are obtained at that point where windage equals the amount of blowdown. Generally, maximum cycles are limited to values between 12 and 20. Once maximum cycles are obtained, there is no blowdown from operation of the cooling tower.

Operation at higher cycles generally results in saturation limits being exceeded. As a result, acid or scale inhibitors must be added to the water to prevent scale formation. In practice, acid is not recommended due to health, safety and control issues. The use of scale inhibiting products generally limits the system to a maximum of 150 to 200 times saturation, such as taught in U.S. Pat. No. 6,645,384, herein incorporated by reference in its entirety. In most cases, the cycles obtained by use of a scale inhibitor is far less than the maximum cycles needed to obtain no blowdown and in cases of hard, alkaline makeup waters can often be as low as 2 or 3, requiring a large blowdown discharge to maintain the system scale and deposit free.

Due to drought conditions, water pollution, and continuing increased usage of fresh water supplies, many areas of the country are experiencing water shortages. In these situations where fresh water is in short supply, it is desirable to limit, or eliminate, cooling tower blowdown to conserve as much water as possible.

The United States Green Building Council (USGBC) has implemented a building certification plan for retrofitted and new buildings, Leadership in Energy and Environmental Design (LEED). The LEED certification program awards "points" for building features that improve energy usage and reduce building operation environmental impact. Reduction, or elimination, of cooling tower blowdown can provide LEED points due to reduced water use and lessened environmental impact. The USGBC LEED program is another driver towards reduction, or elimination, of cooling tower blowdown.

Many methods have been proposed for decreasing, or eliminating, blowdown from cooling towers. In one approach described in U.S. Pat. No. 4,931,187, herein incorporated by reference in its entirety, the amount of scale causing calcium added to a cooling tower is carefully controlled, by operation of a complex system of cooling water analysis, makeup softening, and controlled hard water bypass, under computer control, to maintain the cooling water saturation below a level at which scale formation would occur. This approach is costly and has proven to be impractical in practice due to analytical and control difficulties.

Another approach, as described in U.S. Pat. No. 5,730,879, herein incorporated by reference in its entirety, is to equip the cooling tower with a bypass cation resin exchanger operated in the hydrogen (strong acid) mode with bypass of cooling water through the exchanger governed by the pH of the cooling water. The rate of bypass flow is governed by the desired pH, which is selected so as to maintain the cooling water below saturation thus preventing scale as the cycles are increased. Problems with this approach involve plugging of the resin exchanger with suspended solids typically found in cooling water and the need for constant replacement of the cation resin as its acid charge is used. An additional potential problem is that if control of the bypass flow through the acid cation resin is lost, either severe scale formation will occur or acid induced corrosion of the cooling tower structure can result. A modification is given in U.S. Pat. No. 4,532,045, herein incorporated by reference in its entirety, with the addition of a bypass filter to remove suspended solids and use of weak acid mode cation resin to reduce the possibility of severe corrosion from loss of pH control. This method still suffers from the constant replacement of the cation resin as its weak acid charge is used and from control difficulties.

In yet another bypass method, U.S. Pat. No. 7,157,008, herein incorporated by reference in its entirety, describes the use of bypass chemical precipitation of hardness causing calcium from the cooling water, thus allowing higher cycles and potential elimination of blowdown. This process involves strict chemical addition of precipitating agents to the bypass cooling water flow, removal of the formed solids, and produces a liquid sludge, containing scale causing materials, for disposal. Equipment costs are quite high with this process and process control requirements are substantial.

Another method of increasing cycles to minimize blowdown is described in U.S. Pat. No. 7,122,148, herein incorporated by reference in its entirety. This process involves softening the makeup water and increasing the cycles to a point where no blowdown would be needed. No additional products are used for corrosion control. Corrosion control is due to the buildup of silica in the water by cycling and silica precipitation is prevented by maintaining a high pH in the cooling water by either natural elevation due to cycling or by the addition of sodium hydroxide. This method does not work well in current practice as cycled softened water is extremely corrosive to most materials used to construct cooling towers, in particular steel, galvanized steel, zinc, and yellow metal alloys.

None of these methods are in current common use to increase cycles to minimize, or eliminate, blowdown from evaporative cooling towers. There is a need for compositions to control and methods to prevent, corrosion and deposition within cooling towers. There is also a need for a practical process to reduce or eliminate cooling tower blowdown.

SUMMARY

The present teachings describe a composition for controlling corrosion and deposition within a cooling tower. According to various embodiments, the composition can comprise an aqueous solution of softened water, 2-acrylamido-2-methylpropyl sulfonic acid (AMPS) acrylic terpolymer, sodium silicate, phosphate, and polyphosphate. In some embodiments, the phosphate can be in the form of phosphate ions provided from phosphoric acid or from various inorganic phosphates such as monosodium phosphate, disodium phosphate, trisodium phosphate, other inorganic phosphate salts, combinations thereof, and the like. The polyphosphate can be in the form of polyphosphate ions provided from, for example, tetrapotassium pyrophosphate, sodium metaphosphate, combinations thereof, and the like. In some embodiments, the phosphate is in the form of an orthophosphate. In some embodiments, the phosphate comprises an orthophosphate and the ratio of orthophosphate to polyphosphate, measured as phosphate ions, can be, for example, from about 0.6:1 to about 1.5:1, or from about 0.8:1 to 1.1:1, or from about 0.8:1.5 to 1:1.5, or from about 1:1 to about 1.1:1. In some embodiments, the composition can comprise at least one of hydroxyethylidene diphosphonic acid, aminotrimethylene phosphonic acid, and phosphonobutane tricarboxylic acid. The composition can comprise an aqueous solution having a pH of about 12.0 or higher. In some embodiments, a composition can further comprise at least one of sodium tolytriazole, sodium mercaptobenzothiazole, zinc oxide, sodium molybdate dihydrate, sodium toluene sulfonate, sodium lauroyl sarcosinate, tetramethyl-5-decyndiol, copper phthalocyanide quad sulfonate, sodium nitrate, and combinations thereof.

According to various embodiments, a composition for controlling corrosion and deposition can be used to minimize corrosion of a cooling system to a level below generally accepted maximum corrosion rates, for example, for mild steel, yellow metal alloys, zinc and galvanized steel, and aluminum and aluminum alloys. According to various embodiments, a composition for controlling corrosion and deposition within a cooling tower can be used in a method to reduce or eliminate blowdown from evaporative cooling tower operation.

The present teachings also provide a method for preventing corrosion and deposition within a cooling tower. The method can reduce or eliminate blowdown from the operation of evaporative cooling towers. In some embodiments, a method can comprise (1) using softened water as makeup water for the cooling tower, (2) filtering the cooling water by a bypass filtration system, (3) adding to the cooling water a composition comprising an aqueous solution of AMPS acrylic terpolymer, sodium silicate, phosphate, and polyphosphate, and (4) using a biocide to control biological growth. The aqueous solution can comprise softened water. In such methods, the composition used can also comprise at least one of hydroxyethylidene diphosphonic acid, aminotrimethylene phosphonic acid, and phosphonobutane tricarboxylic acid. The pH of the aqueous solution can be about 12.0 or higher, for example, 12.2 or higher, 12.4 or higher, 12.6 or higher, or from about 12.0 to about 13.0 in some embodiments.

According to various embodiments, a combination of above steps (1) through (4) can permit the cycles of an operating cooling tower to be increased to any level desired, up to and including a maximum value where windage equals blowdown and the cooling tower can operate with no blowdown.

The present teachings further provide a process for operating an evaporative cooling water system with minimal or no blowdown. According to various embodiments, the process can comprise (i) using sodium cation exchange softening of all makeup water, (ii) using bypass filtration for removal of suspended solids from the cooling water, (iii) using a composition added to the cooling water to control corrosion and deposition within the cooling water system, and (iv) using electrolytic bromine as a biocide added to the cooling water.

Additional features and advantages of the present teachings will be set forth in the description which follows, and in part will be apparent from the description, or may be learned by practice of the present teachings. It is to be understood that both the foregoing summary and the following detailed description are exemplary and explanatory only and are intended to provide further explanation of the present teachings, as claimed.

DETAILED DESCRIPTION

According to various embodiments, a composition for controlling corrosion and deposition within a cooling tower can comprise an aqueous solution of 2-acrylamido-2-methylpropyl sulfonic acid (AMPS) acrylic terpolymer, sodium silicate, phosphate, and polyphosphate. In some embodiments, the phosphate can be in the form of phosphate ions provided from phosphoric acid or from various inorganic phosphates such as monosodium phosphate, disodium phosphate, trisodium phosphate, other inorganic phosphate salts, combinations thereof, and the like. The polyphosphate can be in the form of polyphosphate ions provided from, for example, tetrapotassium pyrophosphate, sodium metaphosphate, combinations thereof, and the like. In some embodiments, the phosphate is in the form of an orthophosphate. In some embodiments, the phosphate comprises an orthophosphate and the ratio of orthophosphate to polyphosphate, measured as phosphate ions, can be, for example, from about 0.6:1 to about 1.5:1, or from about 0.8:1 to 1.1:1, or from about 0.8:1.5 to 1:1.5, or from about 1:1 to about 1.1:1.

In some embodiments, the composition can further comprise at least one of hydroxyethylidene diphosphonic acid, aminotrimethylene phosphonic acid, and phosphonobutane tricarboxylic acid. In some embodiments, the composition can comprise an aqueous solution having a final pH of about 12.0 or higher, for example, 12.2 or higher, 12.4 or higher, 12.6 or higher, or from about 12.0 to about 13.0 in some embodiments.

According to various embodiments, the composition can have a pH of at least 10.0. In some embodiments, a composition can have a pH of about 12.0 or higher, for example, a pH in a range of from about 12.0 to about 14.0, of from about 12.0 to about 12.5, or of from about 13.2 to about 13.8.

According to various embodiments of a composition, the AMPS acrylic terpolymer can be present in the composition in an amount of at least about 1.0% by weight, for example, in an amount in a range of from about 1.5% by weight to about 10% by weight, in an amount in a range of from about 2.0% to about 5.0% by weight, or in an amount in a range of from about 2.5% to about 3.5% by weight, based on the total weight of the composition.

According to various embodiments, sodium silicate can be present in the composition in an amount of at least 1.0% by weight, for example, in an amount in a range of from about 1.0% to about 10% by weight, in an amount in a range of from about 2.0% to about 8.0% by weight, or in an amount in a range of from about 3.5% to about 6.0% by weight, based on the total weight of the composition. In some embodiments the sodium silicate can be present in a form comprising sodium polysilicate. The sodium silicate can comprise, for example, grade 40 sodium silicate, available from the Oxy division of Occidental Chemical Corporation, of Dallas, Tex. In some embodiments, the sodium silicate can comprise or be provided in the form of an aqueous solution comprising about 9.1% by weight $Na_2O$, about 29.2% by weight $SiO_2$, and about 61.7% by weight $H_2O$, based on the weight of the sodium silicate solution. In various embodiments, the sodium silicate can comprise an $SiO_2/Na_2O$ weight ratio in a range of from about 2.0 to about 4.0, for example, from about 3.0 to about 3.5, or from about 3.2 to about 3.3. In some embodiments, additional $SiO_2$ can be added to a grade 40 sodium silicate solution, and then heated, or otherwise processed, to increase the stoichiometric ratio of $SiO_2$ to $Na_2O$.

According to various embodiments, the composition can comprise phosphate ions as $PO_4$, for example, provided from phosphoric acid. In some embodiments, the composition can comprise a polyphosphate ions as $PO_4$, for example, provided from tetrapotassium pyrophosphate. In some embodiments, the composition can comprise a combination of phosphate ions and polyphosphate ions, for example, provided from phosphoric acid and tetrapotassium pyrophosphate. In some embodiments, the phosphate ions are provided in the form of a phosphoric acid that is made up of about 96.7% phosphate ions, and the polyphosphate ions are in the form of a tetrapotassium pyrophosphate that is made up of about 56.8% polyphosphate ions. According to various embodiments, both phosphate ions and polyphosphate ions can be present in the composition, for example, in a stoichiometric ratio of from about 1:0.7 to about 1:1.6, or within a range of from about 1:0.9 to about 1:1.3, or at a ratio of about 1:1.1. In some embodiments, the high end of the range can be from about 1.0:1.1 to about 1.0:1.6, and the lower end of the range can be from about 1:0.6 to about 1:1.1. In some embodiments, the total weight of combined phosphate ions and polyphosphate ions can be from about 1.0% by weight to about 6.0% by weight, for example, from about 5.0% by weight to about 6.0% by weight, based on the total weight of the composition.

According to various embodiments, the composition can comprise hydroxyethylidene diphosphonic acid. In some embodiments, the composition can comprise aminotrimethylene phosphonic acid. In some embodiments, the composition can comprise phosphonobutane tricarboxylic acid. In some embodiments, the composition can comprise any combination of hydroxyethylidene diphosphonic acid, aminotrimethylene phosphonic acid, and phosphonobutane tricarboxylic acid.

According to various embodiments, one or more of hydroxyethylidene diphosphonic acid, aminotrimethylene phosphonic acid, and phosphonobutane tricarboxylic acid can be present in the composition, each independently in an amount of, for example, up to about 1.0% by weight, up to about 3.0% by weight, or up to about 6.0% by weight, based on the total weight of the composition. In some embodiments, one or more of these is present in an amount of at least about 1.0% by weight.

According to various embodiments, the composition can comprise potassium hydroxide. In some embodiments, the composition can comprise potassium hydroxide in an amount of at least 1.0% by weight, for example, present in an amount in the range of from about 1.0% by weight to about 25.0% by weight, in a range of from about 2.0% by weight to about 20.0% by weight, or in a range of from about 4.0% by weight to about 13.0% by weight, based on the total weight of the composition. According to various embodiments, the composition can further comprise an alkaline hydroxide, such as sodium hydroxide, potassium hydroxide, a combination of sodium hydroxide and potassium hydroxide, or the like.

According to various embodiments, the composition can comprise softened water, for example, ion-exchanged softened water. As an example, sodium cation-exchanged softened water can be used. In some embodiments, the softened water can be essentially free of cations, for example aluminum, barium, calcium, iron, magnesium, and manganese ions, or contain levels of less than about 0.001% by weight of these metals. In some embodiments, the softened water can comprise a hardness level, measured as a calcium carbonate equivalent, of about 10 mg/l or lower. In some embodiments, the hardness level of the softened water can be 5 mg/l or lower, 2 mg/l or lower, 1 mg/l or lower, or 0.5 mg/l or lower.

According to various embodiments, the composition can further comprise at least one of sodium tolytriazole, sodium mercaptobenzothiazole, zinc oxide, sodium molybdate dihydrate, sodium toluene sulfonate, sodium lauroyl sarcosinate, tetramethyl-5-decyndiol, copper phthalocyanide quad sulfonate, sodium nitrate, or a combination thereof. In some embodiments, the composition can comprise sodium tolytriazole in an amount of up to about 6.0% by weight, for example, from about 2.0% to about 4.0%, sodium mercaptobenzothiazole in an amount up to about 6.0% by weight, for example, from about 2.0% to about 4.0%, zinc oxide in an amount up to about 0.2% by weight, sodium molybdate dihydrate in an amount up to about 4.0% by weight, sodium toluene sulfonate in an amount up to about 1.5% by weight, sodium lauroyl sarcosinate in an amount up to about 2.3% by weight, tetramethyl-5-decyndiol in an amount up to about 1.0% by weight, copper phthalocyanide quad sulfonate in an amount up to about 1.0% by weight, and/or sodium nitrate in an amount up to about 5.0% by weight. In some embodiments, the amounts of each of these components can independently be double the amount mentioned above, half of the amount mentioned above, or within the range of from about half to about double of each respective amount mentioned above. Each can independently be present in the composition, or absent.

According to various embodiments, the composition can further comprise one or more of sodium tolytriazole, sodium mercaptobenzothiazole, zinc oxide, sodium molybdate dihydrate, sodium toluene sulfonate, sodium lauroyl sarcosinate, tetramethyl-5-decyndiol, copper phthalocyanide quad sulfonate, and sodium nitrate, for example, each independently present in an amount of up to about 1.0% by weight, or from about 0.1% by weight to about 0.9% by weight, based on the total weight of the composition.

According to various embodiments, an exemplary composition for controlling corrosion and deposition can have the formulation shown below in Table 1. Unless indicated otherwise, all amounts, percentages, ratios, and the like, described herein, are by weight. All of the components are commercially available.

TABLE 1

| Component | CAS Number | Weight % |
|---|---|---|
| potassium hydroxide | 1310-58-3 | 4.0 to 13.0 |
| hydroxyethylidene diphosphonic acid | 2809-21-4 | 0.0 to 3.0 |
| aminotrimethylene phosphonic acid | 6419-19-8 | 0.0 to 3.0 |
| phosphonobutane tricarboxylic acid | 37971-36-1 | 0.0 to 3.0 |
| AMPS acrylic terpolymer | 151066-66-5 | 2.0 to 3.5 |
| phosphoric acid | 7664-38-2 | 1.1 to 6.0 |
| tetrapotassium pyrophosphate | 7320-34-5 | 1.9 to 9.5 |
| sodium tolytriazole | 64665-57-2 | 0.0 to 6.0 |
| sodium mercaptobenzothiazole | 2492-26-4 | 0.0 to 6.0 |
| sodium silicate | 6834-92-0 | 3.5 to 6.0 |
| zinc oxide | 1314-13-2 | 0.0 to 0.2 |
| sodium molybdate dehydrate | 7631-95-0 | 0.0 to 4.0 |
| sodium toluene sulfonate | 12068-03-0 | 0.0 to 1.5 |
| sodium lauroyl sarcosinate | 137-16-6 | 0.0 to 2.3 |
| tetramethyl-5-decyndiol | 126-86-3 | 0.0 to 1.0 |
| copper phthalocyanide quad sulfonate | | 0.0 to 1.0 |
| sodium nitrate | 7631-99-4 | 0.0 to 5.0 |

Balance soft water, final formulation pH above 12.0

More specific exemplary compositions for controlling corrosion and deposition can have the formulations shown below in Tables 2-4.

TABLE 2

| Component | CAS Number | Weight % |
|---|---|---|
| potassium hydroxide | 1310-58-3 | 12.0 |
| hydroxyethylidene diphosphonic acid | 2809-21-4 | 2.5 |
| AMPS acrylic terpolymer | 151066-66-5 | 2.5 |
| phosphoric acid | 7664-38-2 | 2.0 |
| tetrapotassium pyrophosphate | 7320-34-5 | 2.2 |
| sodium mercaptobenzothiazole | 2492-26-4 | 4.0 |
| sodium silicate | 6834-92-0 | 3.5 |
| zinc oxide | 1314-13-2 | 0.2 |
| sodium toluene sulfonate | 12068-03-0 | 1.0 |
| sodium lauroyl sarcosinate | 137-16-6 | 1.0 |

Balance soft water, final formulation pH in range 13.2 to 13.8

TABLE 3

| Component | CAS Number | Weight % |
|---|---|---|
| potassium hydroxide | 1310-58-3 | 12.0 |
| hydroxyethylidene diphosphonic acid | 2809-21-4 | 2.5 |
| AMPS acrylic terpolymer | 151066-66-5 | 2.5 |
| phosphoric acid | 7664-38-2 | 2.0 |
| tetrapotassium pyrophosphate | 7320-34-5 | 2.2 |
| sodium mercaptobenzothiazole | 2492-26-4 | 1.5 |
| sodium silicate | 6834-92-0 | 4.0 |
| sodium molybdate dehydrate | 7631-95-0 | 3.5 |
| sodium toluene sulfonate | 12068-03-0 | 1.0 |
| sodium lauroyl sarcosinate | 137-16-6 | 1.0 |

Balance soft water, final formulation pH in range 13.2 to 13.8

TABLE 4

| Component | CAS Number | Weight % |
|---|---|---|
| potassium hydroxide | 1310-58-3 | 9.4 |
| hydroxyethylidene diphosphonic acid | 2809-21-4 | 2.5 |
| AMPS acrylic terpolymer | 151066-66-5 | 2.5 |
| phosphoric acid | 7664-38-2 | 2.0 |
| tetrapotassium pyrophosphate | 7320-34-5 | 2.2 |
| sodium tolytriazole | 64665-57-2 | 2.0 |
| sodium silicate | 6834-92-0 | 3.5 |
| sodium toluene sulfonate | 12068-03-0 | 0.4 |
| sodium lauroyl sarcosinate | 137-16-6 | 1.0 |
| tetramethyl-5-decyndiol | 126-86-3 | 0.2 |
| copper phthalocyanide quad sulfonate | | 0.66 |

Balance soft water, final formulation pH in range 12.0 to 12.5

As can be seen, common to the formulations shown in Tables 2-4 is the presence of sodium silicate, AMPS acrylic terpolymer, phosphate from phosphoric acid, and polyphosphate from tetrapotassium pyrophosphate. According to the present teachings, phosphate and polyphosphate in the proper proportions in combination with sodium silicate can provide an excellent primary corrosion control barrier to protect various materials from accelerated corrosion. The AMPS acrylic terpolymer can control deposition on various materials and can prevent accelerated corrosion via deposit corrosion.

According to various embodiments, the formulation of the composition can be adjusted dependent upon the materials used in the cooling system construction. In some embodiments, the composition can comprise sodium nitrate when aluminum is known to be present as a material of the cooling system construction. In some embodiments, the composition can comprise sodium tolytriazole when yellow metal components are utilized, for example, brass, bronze, copper alloys, and the like. In some embodiments, a specific composition formulation can be adjusted to be used with, for example, soft steel, zinc, or galvanized steel.

According to various embodiments, in addition to sodium silicate, AMPS acrylic terpolymer, phosphoric acid, and tetrapotassium pyrophosphate, other components can be provided in the composition, for example, one or more of sodium lauroyl sarcosinate, and zinc oxide. These components can be used, for example, to increase the corrosion control ability of a composition. This effect can be additive such that the more components present the higher a degree of corrosion control that can be achieved. Of course, with more components, a higher product cost results, such that a trade-off can generally be made between cost, due to the number of components present, and the degree of corrosion control desired.

According to various embodiments, a method for preventing corrosion and deposition within a cooling tower can comprise (1) using softened water as makeup water for the cooling tower, (2) filtering the cooling water by a bypass filtration system, (3) adding to the cooling water a composition of the present teachings, and (4) using a biocide to control biological growth. In some embodiments, the composition can comprise an aqueous solution of softened water, AMPS acrylic terpolymer, sodium silicate, phosphoric acid, and tetrapotassium pyrophosphate. In some embodiments, the composition can be as described above and/or can further comprise at least one of hydroxyethylidene diphosphonic acid, aminotrimethylene phosphonic acid, and phosphonobutane tricarboxylic acid. In some embodiments, the composition can comprise an aqueous solution having a pH of about 10.0 or higher, for example, of about 12.0 or higher. In some embodiments, the method can provide for increased cycles of an operating cooling tower. The cycles can be increased, for example, up to and including a maximum value whereat the loss of water through windage equals blowdown. According to various embodiments of the method, the cooling tower can be operated with no blowdown.

According to various embodiments, the softened water used in the method as makeup water for the cooling tower can comprise ion-exchanged softened water, for example, sodium cation-exchanged softened water. Sodium cation exchange softening of the makeup water can be used to totally remove or essentially remove, all cations, for example, all of aluminum, barium, calcium, iron, magnesium, and manganese ions. These cations are known to form scale in cooling towers operated at high cycles. In various embodiments, no pH adjustment or conversion of anion content of the makeup water is made. As a result, the cycled cooling water can become quite alkaline and experience an increase in pH over that of the makeup water. For example, the cooling water can reach a pH value of about 9.0 to about 9.8. At high pH and alkalinity values, the solubility of known scale-forming materials, for example, silica, substantially increases, eliminating scale formation caused by such material.

Various methods for sodium cation exchange water softening can be used, as are known to those of skill in the art.

In general, it has been determined that a practical limit to the number of cycles without a means to remove suspended solids from the cooling water is approximately six. Since much higher levels of cycles are desired, according to various embodiments, bypass filtration can be provided to remove suspended solids from the cooling water. A variety of filtration methods can be used for this task, for example backwashing media filters, using disposable cartridge filters, using hydrocyclonic filters, using membrane filters, and the like. In some embodiments, the cooling water can be filtered using a bypass filtration system at a rate of from about 5% to about 15% of the total cooling water recirculation rate. Alternatively, a bypass filtration system can provide from about 1 to about 10 cooling water system volume turnovers per day. In some embodiments, the filters utilized have a capability of removing a significant amount of suspended solids down to a size range of less than about 10 microns, for example, of less than about two microns.

According to various embodiments, a method for preventing corrosion and deposition within a cooling tower is provided and uses a composition comprising an aqueous solution of softened water, AMPS acrylic terpolymer, sodium silicate, phosphoric acid, and tetrapotassium pyrophosphate, and at least one of hydroxyethylidene diphosphonic acid, aminotrimethylene phosphonic acid, and phosphonobutane tricarboxylic acid. The composition can be added to the cooling water. Depending on the cooling tower construction material, a specified formulation of a composition can be added. For example, in some embodiments, a composition can further comprise at least one of sodium tolytriazole, sodium mercaptobenzothiazole, zinc oxide, sodium molybdate dihydrate, sodium toluene sulfonate, sodium lauroyl sarcosinate, tetramethyl-5-decyndiol, copper phthalocyanine quad sulfonate, sodium nitrate, or a combination thereof. In some embodiments, the aqueous solution can have a pH of about 10.0 or higher, for example, a pH of about 12.0 or higher. In some embodiments, the softened water can comprise sodium cation-exchanged softened water.

Given the extreme corrosiveness of cycled softened water, the method for preventing corrosion and deposition within a cooling tower can utilize a composition of the present teachings to prevent corrosion and subsequent deposition of products of corrosion onto the cooling system materials, for example, onto the surfaces of tanks and piping within the cooling system. According to various embodiments, the method can comprise using a composition at a dosage level in a range of from about 100 mg/L to about 700 mg/L, for example, from about 200 mg/L to about 500 mg/L, or from about 250 mg/L to about 350 mg/L.

According to various embodiments, the method can provide corrosion prevention below generally accepted maximum corrosion rates of, for example, about 3 mil/yr for mild steel, about 0.5 mil/yr for yellow metal alloys, about 5 mil/yr for zinc and galvanized steel, and about 5 mil/yr for aluminum and aluminum alloys. In some embodiments, the method can reduce corrosion products deposition below corrosion rates of less than about 2 mil/yr for mild steel, less than about 0.2 mil/yr for yellow metal alloys, less than about 3 mil/yr for zinc and galvanized steel, and less than about 2 mil/yr for aluminum and aluminum alloys. In other embodiments, the method can prevent accelerated corrosion of zinc or galvanized steel that can occur at cooling water pH values in excess of 8.2, commonly referred to as "white rust".

According to various embodiments, dosage control of the composition can be affected by manual or automatic analysis of the cooling water and subsequent manual or automatic addition of the composition. In some embodiments, dosage control can be affected by measurement of the volume of makeup water added to the cooling tower with subsequent automatic addition of a proportional amount of composition to maintain established control levels, for example, via a chemical pump. In other embodiments, dosage control can be affected by an automatic product level determination, for example, via methods, products, and processes as disclosed in U.S. patent application Ser. No. 11/700,643, filed Jan. 31, 2007, which is herein incorporated by reference in its entirety.

According to various embodiments, the method can comprise using a biocide for control of biological growth within a cooling tower and associated system. In some embodiments, the biocide can comprise bromine. In other embodiments the biocide can comprise electrolytic bromine as the sole biocide, as described, for example, in U.S. patent application Ser. No. 11/807,402, filed May 29, 2007, which is herein incorporated by reference in its entirety. In some embodiments, additional biocides can be utilized with acceptable results such as, for example, ozone, chlorine dioxide, chlorine, sodium hypochlorite, various organic biocides, hydrogen peroxide, combinations thereof, and the like.

According to various embodiments, a process for operating an evaporative cooling water system with minimal or no blowdown is provided and can comprise (i) using sodium cation exchange softening of all makeup water, (ii) using bypass filtration for removal of suspended solids from the cooling water, (iii) using a composition of the present teachings added to the cooling water to control corrosion and deposition within the cooling water system, and (iv) using electrolytic bromine as a biocide added to the cooling water.

The present teachings will be further explained with reference to the examples shown below, which are illustrative only and not intended to be limiting.

EXAMPLE 1

A specific composition formulation optimized for a cooling system to be treated was selected by considering the system construction materials and the degree of corrosion and deposition control desired. The composition had the formulation described below in Table 4, because the composition is good for use with water systems constructed of steel and yellow metal alloys, and because a high degree of corrosion and deposition control was desired. The composition was selected to give a working range of from about 250 mg/L to about 350 mg/L in the treated water, utilizing automated determination of the amount of copper phthalocyanide quad sulfonate for dose control.

The composition was dosed into a cooling tower system in which 100% of the makeup water was sodium cation-exchanged softened water softened to a maximum hardness level measured as calcium carbonate equivalent of less than about 10 mg/L in the softened water. The cooling system was equipped with a bypass media filter sized to turnover the cooling system volume about two times per day and capable of removing suspended solids down to about 2 microns in size. Biocide was added on a twice a week basis using an electrolytic bromine generator to maintain a total bromine level from about 0.5 mg/L to about 1.0 mg/L following completion of the dose.

The cooling tower was operated with no blowdown. The cycles were increased to a maximum allowed by the cooling tower windage loss, which was a function of the cooling tower construction, operating flow rate, and air flow through the unit. A maximum cycle value in a range of from about 12 to about 20 was reached, although lower and higher values were possible.

EXAMPLE 2

A study for the City of Tempe, Ariz., showed a water use reduction of 756,000 gallons per year on a 176 ton cooling tower by going from three cycles to no blowdown operation using the described process and material composition with backwashing media bypass filtration and electrolytic bromine as the biocide. This particular study was a result of a USGBC LEED certification for a new transportation center building being constructed by the City of Tempe.

Other embodiments will be apparent to those skilled in the art from consideration of the present specification and practice of the present teachings disclosed herein. It is intended that the present specification and examples be considered exemplary only.

What is claimed is:

1. A method of preventing corrosion and deposition within a cooling tower, the cooling tower containing cooling water contained therein, the method comprising:
   adding softened water as makeup water for the cooling tower;
   filtering the cooling water by a bypass filtration system;
   adding to the cooling water a composition comprising an aqueous solution of softened water, AMPS acrylic terpolymer, sodium silicate, a source of phosphate ions, and a source of polyphosphate ions; and
   adding a biocide to control biological growth.

2. The method of claim 1, wherein the composition further comprises and at least one of hydroxyethylidene diphosphonic acid, aminotrimethylene phosphonic acid, and phosphonobutane tricarboxylic acid.

3. The method of claim 1, wherein the biocide comprises bromine.

4. The method of claim 1, wherein the composition is maintained in the cooling water at a level in a range of from about 100 mg/l to about 700 mg/l.

5. A method for operating an evaporative cooling water system with minimal or no blowdown, comprising
   (i) using sodium cation exchange softening of all makeup water;
   (ii) using bypass filtration for removal of suspended solids from the cooling water;
   (iii) using a composition added to the cooling water to control corrosion and deposition within the cooling water system, wherein the composition comprises softened water, AMPS acrylic terpolymer, sodium silicate, a source of phosphate ions, and a source of polyphosphate ions; and
   (iv) using electrolytic bromine as a biocide added to the cooling water.

6. The method of claim 5, wherein the composition further comprises at least one of hydroxyethylidene diphosphonic acid, aminotrimethylene phosphonic acid, and phosphonobutane tricarboxylic acid.

7. The method of claim 5, wherein the source of phosphate ions comprises phosphoric acid, and the source of polyphosphate ions comprises tetrapotassium pyrophosphate.

* * * * *

UNITED STATES PATENT AND TRADEMARK OFFICE
CERTIFICATE OF CORRECTION

PATENT NO. : 7,595,000 B2  
APPLICATION NO. : 12/070794  
DATED : September 29, 2009  
INVENTOR(S) : Timothy E. Keister Page 1 of 1

It is certified that error appears in the above-identified patent and that said Letters Patent is hereby corrected as shown below:

Title page, item (73) Assignee:
The name of the assignee "ProChamTech International, Inc., Brockway, PA (US)"
should be -- ProChemTech International, Inc., Brockway, PA (US) --.

Signed and Sealed this

Twentieth Day of July, 2010

David J. Kappos
*Director of the United States Patent and Trademark Office*

(12) EX PARTE REEXAMINATION CERTIFICATE (9200th)
United States Patent
Keister

(10) Number: US 7,595,000 C1
(45) Certificate Issued: Aug. 14, 2012

(54) OPERATION OF EVAPORATIVE COOLING TOWER WITH MINIMAL OR NO BLOWDOWN

(75) Inventor: Timothy E. Keister, Brockway, PA (US)

(73) Assignee: Prochemtech International, Inc., Brockway, PA (US)

Reexamination Request:
No. 90/009,792, Jul. 30, 2010

Reexamination Certificate for:
Patent No.: 7,595,000
Issued: Sep. 29, 2009
Appl. No.: 12/070,794
Filed: Feb. 21, 2008

Certificate of Correction issued Jul. 20, 2010.

(51) Int. Cl.
*C02F 1/42* (2006.01)

(52) U.S. Cl. ............. 210/687; 210/167.1; 210/697; 210/701

(58) Field of Classification Search .......... None
See application file for complete search history.

(56) References Cited

To view the complete listing of prior art documents cited during the proceeding for Reexamination Control Number 90/009,792, please refer to the USPTO's public Patent Application Information Retrieval (PAIR) system under the Display References tab.

*Primary Examiner* — Sean E Vincent

(57) ABSTRACT

A method and composition are provided for the operation of an evaporative cooling tower with minimal, or no, blowdown. In some embodiments, the method involves using sodium cation-exchanged softened water as makeup water for the cooling tower, providing a bypass filter for suspended solids removal from the cooling water, treating the cooling water with a composition for control of corrosion and deposition, and using an effective biocide for control of biological growth within the cooling tower system. In some embodiments, a composition is provided that comprises AMPS acrylic terpolymer, sodium silicate, phosphate ions, and polyphosphate ions. When dosed at the recommended levels, the composition controls corrosion of cooling system materials to generally acceptable levels in spite of the extremely corrosive environment resulting from the cycling of sodium cation-exchanged softened water in the cooling tower.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-7 is confirmed.

New claims 8-20 are added and determined to be patentable.

*8. The method of claim 1, wherein the sodium silicate is present in an amount of at least 1% by weight based on the total weight of the composition, and the source of phosphate ions and the source of polyphosphate ions provides phosphate ions and polyphosphate ions at a respective stoichiometric ratio of from about 1:0.7 to about 1:1.6.*

*9. The method of claim 5, wherein the sodium silicate is present in an amount of at least 1% by weight based on the total weight of the composition, and the source of phosphate ions and the source of polyphosphate ions provides phosphate ions and polyphosphate ions at a respective stoichiometric ratio of from about 1:0.7 to about 1:1.6.*

*10. The method of claim 1, wherein the combined weight of phosphate ions and polyphosphate ions is from about 5.0% by weight to about 6.0% by weight based on the total weight of the composition.*

*11. The method of claim 5, wherein the combined weight of phosphate ions and polyphosphate ions is from about 5.0% by weight to about 6.0% by weight based on the total weight of the composition.*

*12. The method of claim 1, wherein the composition further comprises from about 1.0% by weight to about 25.0% by weight potassium hydroxide based on the total weight of the composition.*

*13. The method of claim 5, wherein the composition further comprises from about 1.0% by weight to about 25.0% by weight potassium hydroxide based on the total weight of the composition.*

*14. The method of claim 1, further comprising increasing cycles of operation of the cooling tower to a maximum value whereat loss of water through windage equals blowdown.*

*15. The method of claim 5, further comprising increasing cycles of operation of the cooling tower to a maximum value whereat loss of water through windage equals blowdown.*

*16. The method of claim 1, further comprising operating the cooling tower with no blowdown.*

*17. The method of claim 1, wherein the softened water added during the adding softened water as makeup water comprises a hardness level, measured as calcium carbonate equivalent, of about 10 mg/L or lower.*

*18. The method of claim 5, wherein the softened water added during the adding softened water as makeup water comprises a hardness level, measured as calcium carbonate equivalent, of about 10 mg/L or lower.*

*19. The method of claim 1, wherein the sodium silicate has a molar ratio of $SiO_2:Na_2O$ of from about 3.2:1 to about 3.3:1 by weight.*

*20. The method of claim 5, wherein the sodium silicate has a molar ratio of $SiO_2:Na_2O$ of from about 3.2:1 to about 3.3:1 by weight.*

\* \* \* \* \*